US006755276B2

(12) United States Patent
Clephas

(10) Patent No.: US 6,755,276 B2
(45) Date of Patent: Jun. 29, 2004

(54) STEER-BY-WIRE APPARATUS AND SYSTEM HAVING ANGLE SENSOR FALLBACK

(75) Inventor: Bernd Clephas, Esslingen (DE)

(73) Assignee: Mercedes Benz Lenkungen GmbH (DE)

( * ) Notice: Subject to any disclaimer, the term of this patent is extended or adjusted under 35 U.S.C. 154(b) by 0 days.

(21) Appl. No.: 09/945,433

(22) Filed: Sep. 4, 2001

(65) Prior Publication Data

US 2002/0033301 A1 Mar. 21, 2002

(30) Foreign Application Priority Data

Sep. 20, 2000  (DE) .......................................... 100 46 854

(51) Int. Cl.⁷ ............................................... B62D 5/06
(52) U.S. Cl. ..................................................... 180/402
(58) Field of Search ................................. 180/402–446; 701/41, 42

(56) References Cited

U.S. PATENT DOCUMENTS

| 4,315,555 | A  | * | 2/1982  | Schritt ........................ 180/415 |
| 6,144,137 | A  | * | 11/2000 | Engelbert ................... 310/258 |
| 6,219,604 | B1 | * | 4/2001  | Dilger et al. ................ 701/41 |
| 6,354,393 | B1 | * | 3/2002  | Ahlert et al. ............... 180/403 |
| 6,394,218 | B1 | * | 5/2002  | Heitzer ....................... 180/402 |
| 6,415,212 | B2 | * | 7/2002  | Nishizaki et al. ........... 701/41 |
| 6,427,104 | B1 | * | 7/2002  | Matsushita et al. .......... 701/41 |

FOREIGN PATENT DOCUMENTS

DE          198 55 404 A1      1/1998

* cited by examiner

*Primary Examiner*—Lesley D. Morris
*Assistant Examiner*—Paul Royal, Jr.
(74) *Attorney, Agent, or Firm*—Synnestvedt Lechner & Woodbridge, LLP; Richard C. Woodbridge, Esq.; Roy Roser

(57) ABSTRACT

The invention relates to a power-assisted steering system for non-trackborne vehicles and particularly motor vehicles, having a steering control (e.g. a steering wheel) operated by the driver, a wheel angle positioner to steer the wheels of the vehicle, angle sensors to sense the position of the steering control and/or the wheels of the vehicle, a "feel" provider to generate a "feel" torque to simulate a feedback of force to the steering control, the "feel" provider having an electric motor, at least one control unit for controlling the wheel angle positioner and the "feel" provider, in which in the event of at least one angle sensor, the at least one control unit and/or the "feel" provider failing, the angle to which the steering control is turned is continuously determined from the voltage which is induced in at least one winding of the electric motor by turning the steering control manually and/or from the induced current, and is used to control the steering angle at the wheels of the vehicle.

18 Claims, 3 Drawing Sheets

STEER-BY-WIRE APPARATUS AND SYSTEM HAVING ANGLE SENSOR FALLBACK

This application claims the priority of Germany Application No. 10046854.3 filed Sep. 20, 2000 and entitled ADDITIONAL FALLBACK LEVEL FOR THE FAILURE OF, FOR EXAMPLE, ANGLE SENSORS, FOR STEER-BY-WIRE SYSTEMS NOT HAVING A MECHANICAL/HYDRAULIC FALLBACK CONNECTION by Dr. Bernd Celphas, the entire contents and substance of which are hereby incorporated in total by reference.

FIELD OF THE INVENTION

The present invention relates to a power-assisted steering system which allows a steering angle to be imposed by means of the steering control even if at least one electrical component fails.

BACKGROUND OF THE INVENTION

A power-assisted steering system of a general type and of hydraulic design for non-trackborne vehicles is known from DE-A-19855404. In this power-assisted steering system, the steering movement of the steered wheels of the vehicle is effected by a hydraulic actuator which at any given time can be connected via a shuttle valve to one of two or more hydraulic circuits. These circuits operate in parallel and (in functional terms) in the same direction in the normal mode so that if there is a fault a change can be made to a different hydraulic circuit without any interruption occurring. To control the actuator, each hydraulic circuit includes a servo-valve which (as a function of a desired/actual comparison for the steering angle) is actuated by a control and regulating means. The control and regulating means is connected to a steering-angle actual-value emitter operated by the steered wheels of the wheel and to a steering-angle desired-value emitter which is controlled by a steering control operated at the driver end. To enable drive to be applied to it, the steering control is coupled to a "feel" provider which is formed (for example) by a non-self-locking electric motor which in turn is controlled by a control and regulating arrangement. The power-assisted steering system also has at least one angle sensor which is operated at the driver end by the steering control.

DE-A-19855404 fails to disclose a power assisted steering system to enable the vehicle to continue to be steered in the event of an electrical component failure (particularly of the angle sensor or sensors which detects or detect the position of the steering control).

OBJECT OF THE INVENTION

An object of the present invention is to provide a power-assisted steering system which allows a steering angle to be imposed by means of the steering control even if at least one electrical component fails (and in particular if one or all of the angle sensors for detecting the position of the steering control fail).

SUMMARY OF THE INVENTION

The object of the invention is achieved by a power-assisted steering system for a non-trackborne vehicle having wheels, said system comprising:
  a steering control operated by a driver,
  a wheel angle positioner to steer the wheels,
  angle sensors to sense the position of the steering control and/or the wheels,
  a feel provider to generate a feel torque to simulate a feedback of force to the steering control, the feel provider having an electric motor with at least one winding,
  at least one control unit for controlling the wheel angle positioner and feel provider,
wherein in the event of failure of one or more of the group selected from at least one angle sensor, at least one control unit and the feel provider, the angle to which the steering control is turned is continuously determined from a voltage which is induced in the at least one winding by turning the steering control manually and/or from the induced current, and is used to control the steering angle.

Advantageous embodiments of this power-assisted steering system are described hereinafter.

In a preferred embodiment, the terminal or source voltage (s) (EMF) which can be picked off from the terminals of the at least one winding is used to determine or estimate the angle of the steering control and/or its angular velocity.

In a preferred embodiment, a resistor is connected to each of the terminals of the at least one winding.

In a preferred embodiment, the approximate angle of the steering control is determined starting from the last valid angle for the steering control determined by means of the angle sensors.

In a preferred embodiment, the change in the angle of the steering control is calculated from the equation $$\Delta\phi = a^*_{t_1} \int^{t_2} U dt = a^*[U(t_2) - U(t_1)]$$

(wherein the source voltage values $U(t_2)$ and $U(t_1)$ are within a presettable range).

In a preferred embodiment, a change in angle of $\Delta\phi = 0$ is set for source voltage values below a given threshold voltage.

In a preferred embodiment, for source voltage values of different sizes different constants of proportionality $a_i$ are used to calculate the change in the angle of the steering control.

In a preferred embodiment, the electric motor is a commutator motor or a DC motor.

In a preferred embodiment, the electric motor is a commutator motor and the passages through zero of the terminal voltages from the windings are monitored to allow the change in the angle of the steering control to be calculated.

In a preferred embodiment, when a first terminal voltage passes through zero, the source voltage and the direction of rotation of the steering control is determinable from the difference between the other terminal voltages and the sign of the other terminal voltages and/or the nature of the passage through zero.

In a preferred embodiment, in calculating the virtual position of the steering control, full lock for the wheels is simulated by allowing the value calculated for the angle of the steering control only to lie within specified limits.

In a preferred embodiment, as soon as the angle sensors for the steering control are again supplying valid values, the difference between a valid angle sensor value and the position of the steering control which had been determined by computation up to that point is allowed for by the control unit in its command signal to the wheel angle positioner.

In a preferred embodiment, the power-assisted steering system is a steer-by-wire steering system.

In a preferred embodiment, an additional control unit or an additional electrical circuit performs the calculation of the virtual angle of the steering control.

In a preferred embodiment, the additional control unit or the electrical circuit controls the wheel angle positioner.

In a preferred embodiment, the non-trackborne vehicle is a motor vehicle.

In a preferred embodiment, the steering control is a steering wheel.

In a preferred embodiment, the source voltages are ones that exist within the nominal speed range of the electric motor and when the nominal speed range is exceeded.

In a preferred embodiment, the motor has a large number of poles.

DETAILED DESCRIPTION OF THE INVENTION

Figure 1:
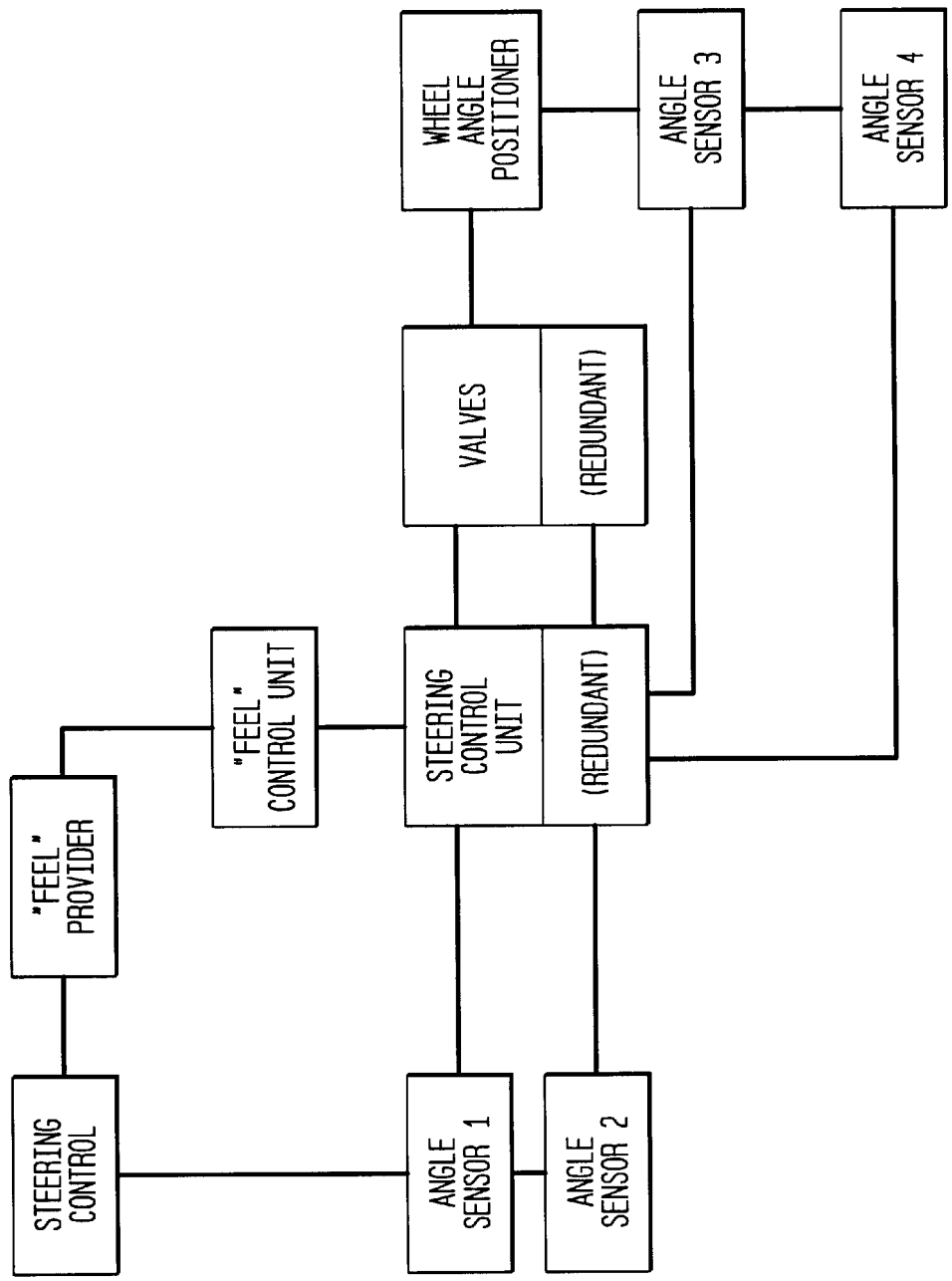
FIGS. 1 and 2 illustrate schematically preferred embodiments of the power-assisted steering system of the invention.

The power-assisted steering system according to the invention is a steer-by-wire system with no mechanical/hydraulic connection between the steering wheel and the steered wheels (often referred to as having no mechanical "fallback" connection between the steering wheel and the steered wheels). Where the power-assisted steering system has a wheel angle positioner 14, the flow of hydraulic fluid is set via valves 16, which may be proportional valves or pulse-width-modulated shuttle valves which may be achieved both under flow control (open center) and under pressure control (closed center). The position of the steering-control 12, which may be a steering-wheel, is sensed by angle sensors, including a first steering-control angle-sensor 18 (steering angle sensor 1 in FIG. 1) and a second steering angle 20 (steering angle-sensor 2 in FIG. 1). The position of the steered wheels is sensed by angle sensors, including a first wheel angle sensor 22 (wheel angle-sensor 1 in FIG. 1), and a second wheel angle-sensor 24 (wheel angle-sensor 2 in FIG. 1). From the signals generated by the angle-sensors 18, 20, 22 and 24, the steering control-units 26 and 28 calculate the actuating signals required and send them to the valves 16. In principle, the system architecture is the same for electrical steering systems except that then the wheel angle positioner is an electric motor and the valves 16 are replaced by power electronics.

As used in this disclosure, the term "steering control" means any conventional, prior art steering control including, but not limited to, steering wheels, joy-sticks, control units or control columns.

With a steering system, there is no safe state for a potential failure and such systems are therefore placed in the highest safety category. This gives rise to a minimum requirement that in the event of any given component or connection failing the ability to steer must still be maintained. For this reason, there are at least two steering-control angle-sensors 18 and 20 at the steering wheel, at least two wheel angle-sensors 22 and 24 at the wheels, at least two steering control-units 26 and 28, and at least two valves 16 and 15 as shown in FIG. 1. The wheel-angle positioner 14 is an exception (as there is only one present in conventional steering systems) so the fact that there is a only a single circuit at this point can be considered to represent the state of the art.

Going beyond the above minimum requirement, an attempt must also be made to achieve the maximum possible system availability (ie to maintain the ability to steer even when there is more than one fault (failure)). For this purpose, it is (for example) possible in a design having two steering control units in a fail-silent architecture to opt for a connection layout where one steering-wheel angle sensor, one steering angle sensor and the two steering control units are all connected to one (CAN) bus and the other two angle sensors are connected to another (CAN) bus which is additionally connected to the two control units. Hence the two control units are available to all the angle sensors and as a result they are both capable of operating in the event of one sensor failing. As already mentioned, there is no mechanical feedback of force to the steering wheel with a steer-by-wire system. However, since feedback of this kind is essential for acceptable comfort, an electric motor, 36, is used to regenerate torque to provide "feel". The motor is fitted with permanent magnets, 40, in the rotor, 38, (a DC or preferably an EC servo-motor of brushless design) and has a control unit of its own. The electric motor 36 has multiple poles 46 with stator windings 42, which may be connected to a passive resistor network. The electromotive force (EMF) or induced voltage may be picked off straight from the terminals 44 of the motor 36's windings 42. Provision may also be made for this in the power-assisted steering system according to the invention. To detect the rotor position (particularly for electronic commutation in EC motors) and to calculate the "feel" torque required as a function of the position of the steering wheel, reliance is placed (in normal fault-free operation) on one of the existing steering-wheel angle sensors.

In the event of the control unit or angle sensor failing or of a fault in the actuating system, the present invention makes provision for an advantageous connection to be made between the stator winding of the electric motor supplying the "feel" torque and a passive resistor network. It is advantageous that the motor automatically generates a damping component which is proportional to the speed of rotation of the steering control. It is true that this mode of operation offers only limited comfort but it is in no way critical as far as safety is concerned and can therefore be employed too as a fallback level.

The present invention exploits the fact that the electromotive force (EMF) produced by a DC or EC motor is virtually proportional to the speed of the motor below the latter's rated speed. If the stator winding is not connected, the EMF can be picked off straight from the terminals of the motor, (although with EC motors, attention must be paid to the commutation to the stator phases). Where there are external connections, allowance must be made for the effect of the network. However where this is a symmetrical resistor network, the voltage applied to the resistors or the current flowing through them is likewise approximately proportional to the EMF (once again with allowance made for the commutation in the case of EC motors).

For regulating/monitoring the "feel" provider, it is generally necessary for the voltage and/or current at its terminals to be measured so that at the fallback level (when for example both the angle sensors for detecting the angle of the steering control have failed and the phases or windings of the electric motor are connected to resistors) the EMF from the motor can be determined from the values measured. The angular velocity can be calculated in turn from the EMF and integrating the latter gives the angle of rotation. Consequently, it is possible for the angle of the steering control or its angular velocity to be determined by means of the "feel" provider without using any additional sensors. It is not however possible for the angle of the steering control to be calculated exactly because as the speed of rotation of the motor diminishes the EMF declines towards zero and thus drops below a measurable threshold. Hence, because very low angular velocities at the steering control are not sensed, a shift may occur in the zero position of the steering control. This however is of no significance to the steering system because there is no mechanical/hydraulic connection which lays downs a fixed zero position for the steering wheel. Hence a shift in the zero position merely represents a slight loss of comfort and convenience, as a result of which the straight-ahead position of the steering control will no longer necessarily mean that the wheels of the vehicle are in the straight-ahead position. The shift in the zero position does not however have any effect on the ability to steer, especially as the "feel" provider for estimating angles is at its fallback level and the "feel" therefore depends simply on the speed at which the steering wheel is turned and not on the absolute angle of the steering wheel and is thus unrelated to the zero position of the latter. As already mentioned, a minimum speed of rotation is therefore needed at the steering control to allow an angle to be estimated. However, in the "feel" providers which are usually used this speed of rotation is of such a low level that it will certainly be exceeded if the steering control is operated normally. Moreover it is a natural reaction for the driver to turn the steering control harder if the expected steering movement fails to materialise at the wheels. As a result, if the minimum speed of rotation is not exceeded earlier, it will certainly then be exceeded.

Particularly when the steering is being turned at fairly high speeds, the relationship between speed of rotation and EMF ceases to be absolutely linear and the estimated change in angle is therefore not entirely proportional to the speed of rotation at the steering wheel. For the steering system, this non-linearity manifests itself as a slight variation in the steering ratio which can be corrected by means of an appropriate algorithm. If no such correction is made, it may cause an additional shift in the zero position of the steering control. Otherwise the driver compensates for the varying ratio almost without noticing.

The transition from normal operation to the fallback level must take place smoothly. If the estimated angle of the steering control is being used as a fallback level, the transition from the value from the angle sensor (which is being used up to the point where the sensor fails) to the estimated value must therefore take place without a jump. For this purpose, an integrating process is advantageous where the last valid angular value from the sensor is used as a starting value for the algorithm. With a DC motor the voltage or current measured at the terminals is (virtually) proportional to the angular velocity of the steering wheel at the fallback level. The requisite proportionality factor can therefore be applied to the value measured and it can be directly integrated. In an advantageous further embodiment of the power-assisted steering system according to the invention, it is possible to compensate for the non-linearity of the relationship between the angular velocity of the rotor and the voltages at the terminals by adaptive proportionality factors. With EC motors, attention must also be paid to the commutation and hence to the way the EMF is split up among the stator phases which depends on the position of the rotor. Calculating the EMF for any given rotor position using a microcontroller of the kind usually used in control units is however a complicated matter and requires a long calculation time. Alternatively, with EC motors the position of the rotor relative to the stator in a system where the pole pitch is set electrically can be determined from the values measured for voltage or current at the terminals.

As a simple implementation, the algorithm described below has advantageously been found suitable. In an m-phase motor, all m of the voltages or currents at the terminals are measured and are monitored against a lower limit or lower threshold value. This threshold value should be set as low as possible but still sufficiently high that any interference on the measurement signals is below it. If all the measured values drop below this threshold value, the angular velocity of the steering control is considered to be zero and the angle estimated for the steering control is left unchanged. This ensures that the angle of the steering control cannot change (due for example to interference signals) when it is stationary. If the measured values rise above the lower threshold value, the individual voltages or currents at the terminals are monitored for their passage through zero which can be reliably detected for time and direction. The EMF can then be determined from the rest of the voltages or currents at the terminals without any complicated calculation in which case the voltage or currents can also be checked against one another for plausibility. In a three-phase motor for example, when the voltage at one terminal passes through zero the amplitudes of the other two voltages are precisely +EMF/2 and −EMF/2 (or in other words the difference between them gives the amplitude of the EMF). The two voltages can easily be checked against one another and their signs together with the nature of the passage through zero (positive-going or negative-going) give the direction of rotation of the steering control.

With this algorithm it is accepted that the value for the EMF and hence the speed of rotation of the steering control can only be calculated at the passage through zero of one of the voltages or currents at the terminals or when the measured values drop below the lower threshold or limit. It is generally only motors with a large number of poles which are used as "feel" providers due to their low detent. With a ten-pole electric motor this means a recalculation every $2\pi/60(=6°)$. On the one hand, the fact that the steering control is stationary can be detected immediately. This effect makes itself felt in the steering system as a whole by an additional shift of the zero position but otherwise it will hardly be noticed by the driver. What is particularly advantageous is that the EMF can be exactly determined and in this way it can be ensured that the direction of rotation of the motor is being correctly detected. Faulty detection of the direction of rotation would in fact lead to the wheels of the vehicle being moved in the opposite direction and would be highly critical even if it happened for only a brief period.

When the angle sensor is again supplying valid values (after an intermittent fault say), it is possible to go back to the values from the sensor by using an algorithm adapted for this purpose which allows for the offset (difference) between the value from the angle sensor and the estimated angular value. A check should however be made to see whether such a return is in fact desirable because even an intermittent failure in the angle sensor is a serious fault. Where a shift in the zero position which occurred during the fallback level is detected by the angle sensors after the return, it can advantageously be corrected by the control system over a certain period of time so that in the end there is no longer any shift in the zero position.

When the "feel" provider is used for estimating angles, there is no steady feedback of force to the steering wheel. The driver is not informed that the wheels are at full lock by a simulated full lock feeling and he may therefore turn the steering wheel too far. The angle-estimating or calculating algorithm must therefore stop the steering control angle which is calculated from becoming larger than the angle at full lock. In the simplest case this is achieved by restricting the integration to the full-lock points. Otherwise the driver would have to undo the whole of his excess rotation of the steering control before it was possible to move the steering in the opposite direction.

Hence the "feel" provider can advantageously be used for angle calculations without any extra hardware being needed. This produces an additional fallback level if both the angle sensors at the steering wheel fail. Hence there is an advantageous increase in system availability.

Figure 2:
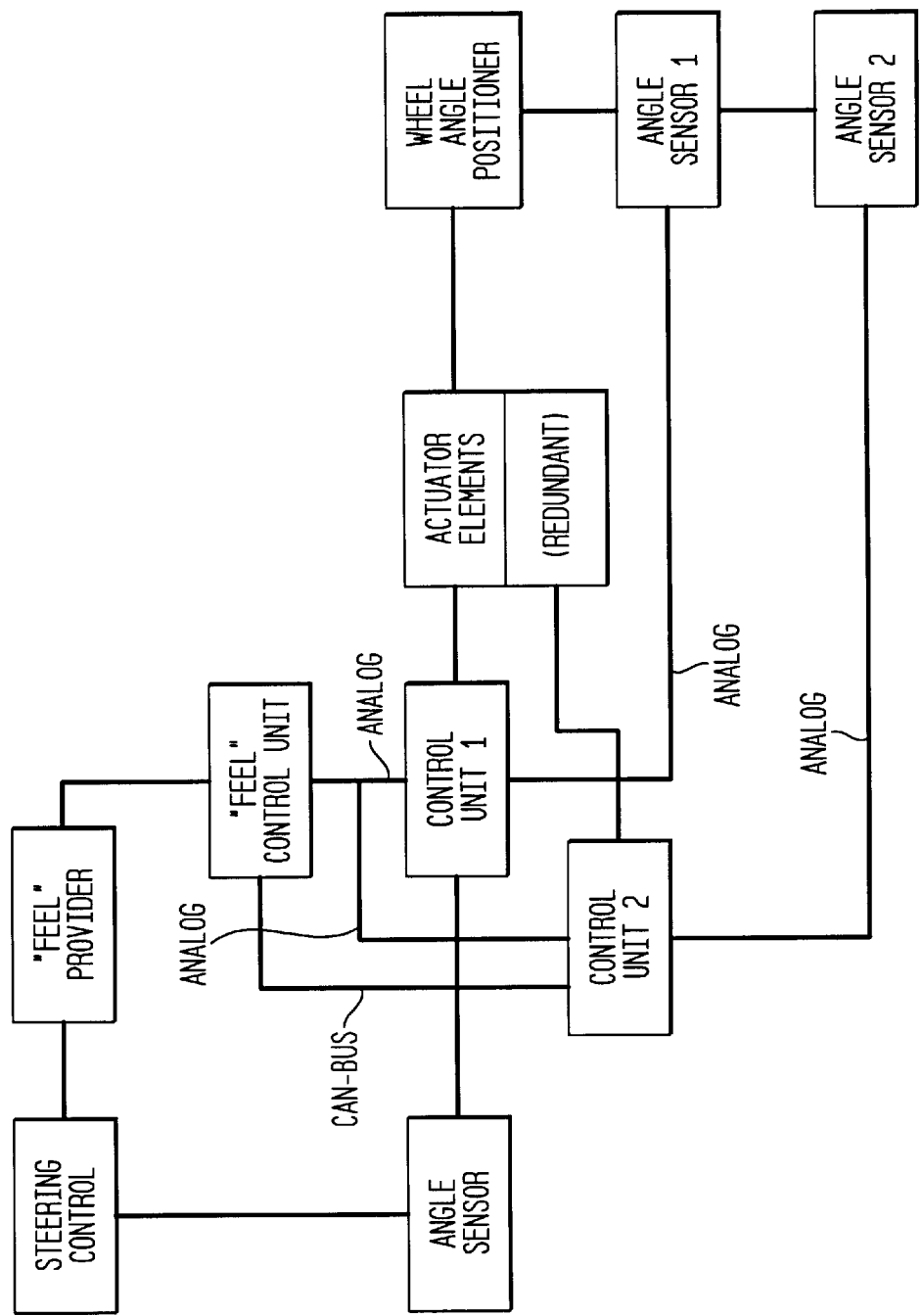
Figure 3:
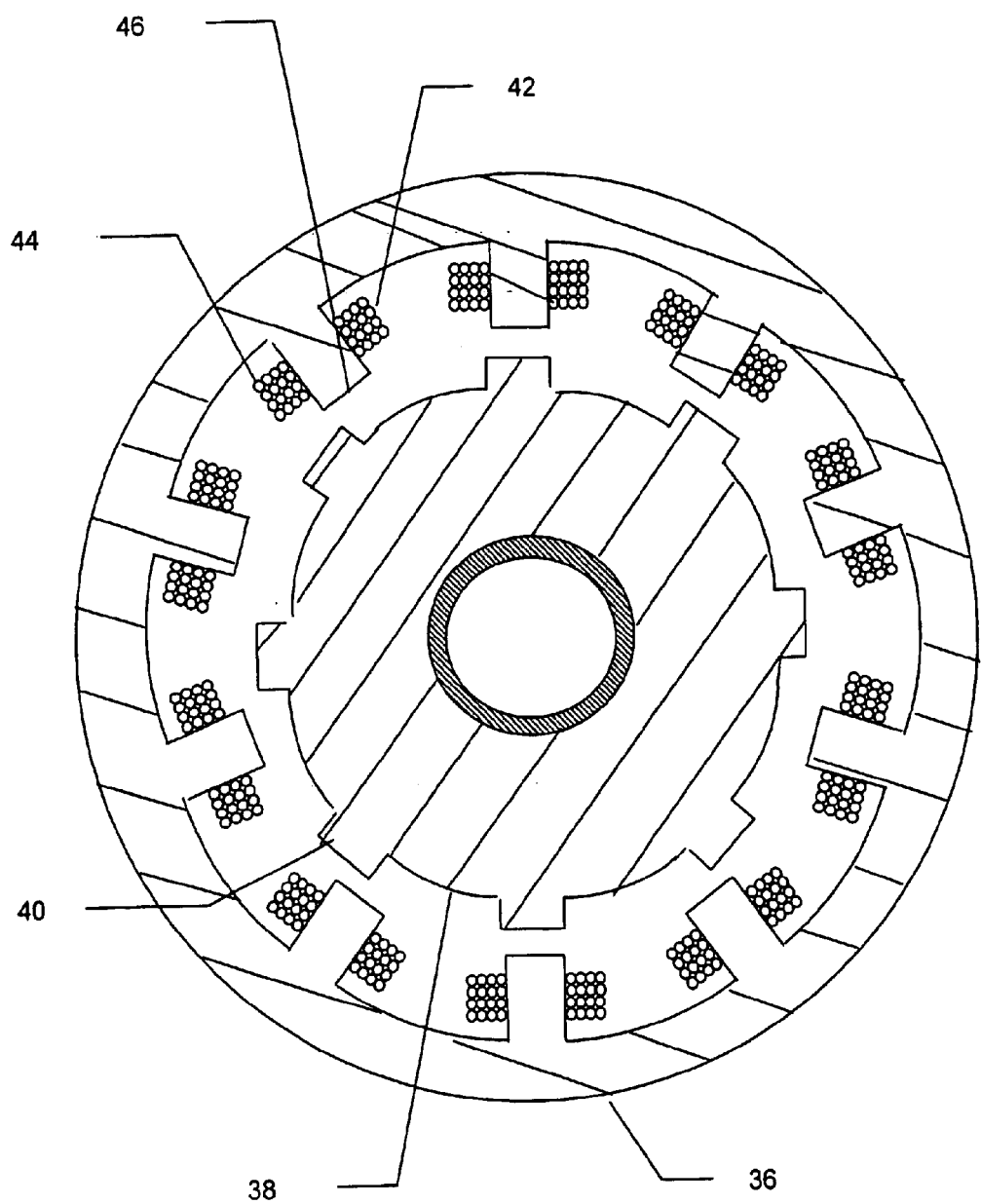
FIG. 3 shows an exemplary cross-sectional view of an electric motor as used in one embodiment of the present invent.

The system architecture which has already been described for the power-assisted steering system according to the invention can advantageously be further simplified because the power-assisted steering system according to the invention has an additional fallback level. FIG. 2 shows a structure for a steer-by-wire system in which there is only one angle-sensor at the steering-wheel. This steering-wheel angle-sensor 18 and the three control-units, the 'feel' control-unit 30, the first steering control-unit 26 and the second steering control-unit 28, are preferably connected together by a CAN bus so that the angle information from the steering wheel angle sensor 18 is available to all the control-units in normal operation. Moreover the control-units can communicate with one another via this bus. If the steering-wheel angle-sensor fails 18, the "feel" provider 32 is switched to its fallback level, (ie the phases are connected to a resistor network). The angle of the steering-control is estimated in the 'feel' control unit 30 for the "feel" provider 32 and is passed on to the other two control-units, first steering control-unit 26 and second steering control-unit 28. If the CAN bus 34 breaks down, the steering angle is transmitted by an additional link 36, such as a volt-free analog link for example. Provided the steering control-units 26 and 28 and the steering-wheel angle-sensor 18 at the steering-wheel are fail-silent, the system architecture shown in FIG. 2 meets the requirement for the ability to steer to be maintained in the event of any given individual fault.

FIGS. 1 and 2 show one possible way of linking the steering angle or wheel angle-sensors 22 and 24 to first and second steering control-units, 26 and 28 via an analog interface or CAN bus for example. If both angle-sensors fail, basic system availability can be maintained if the proportional valve or pulse-width-modulated shuttle valve is actuated in proportion to the angular velocity of the steering wheel. In flow-controlled (open center) systems, an additional direction-dependent offset is required to compensate for the castor return forces at the axle. With the system in this state (at the fallback level), steering is relatively uncomfortable but still possible. What is involved is purely an emergency mode and the only alternative would be total failure of the steering.

We claim:

1. A power-assisted steering system for a non-trackborne vehicle having wheels, said system comprising:
   a steering-control operated by a driver;
   a wheel-angle positioner to steer the wheels;
   a steering-control angle-sensor to provide a determination of the angle to which the steering-control is turned;
   at least one wheel-angle sensor to sense the position of the wheels;
   a feel provider to generate a feel torque to simulate a feedback of force to the steering control, the feel provider having an electric motor;
   a feel provider control-unit for controlling the feel provider; and,
   at least one steering control-unit, responsive to the determination of the angle to which the steering control is turned as provided by the steering-control angle-sensor, for controlling the wheel-angle positioner; and,
   wherein, in the event of failure of the steering-control angle-sensor, the determination of the angle to which the steering-control is turned is then continuously obtained solely from a voltage induced in the feel provider electric motor by turning the steering-control manually, and said determination of steering-control angle obtained from the feel-provider electric motor is used by said at least one steering control-unit to control the wheel-angle positioner.

2. The power-assisted steering system according to claim 1, wherein the determination of the angle to which the steering control is turned, is determined starting from a last valid angle for the steering control determined by means of the steering-control angle-sensors.

3. The power-assisted steering system according to claim 2, wherein the determination of the angle to which the steering-control is turned is made using an equation $$\Delta\phi = a^*_{t1} \int^{t2} U dt$$

in which $\Delta\phi$ represents a change in angle of the steering-control, a represents a constant proportional to the size of the feel provider electric motor, U represents the voltage induced in the feel provider electric motor, $t_1$ represents a time corresponding to the last valid angle for the steering control and $t_2$ represents a current time.

4. The power-assisted steering system according to claim 3 wherein the change in angle, $\Delta\phi$, is set equal to zero when the induced voltage is less than a given threshold voltage.

5. The power-assisted steering system according to claim 3 wherein different values of the induced voltage, U, different constants of proportionality $a_i$ are used to calculate the change in the angle of the steering control.

6. The power-assisted steering system according to clam 2, wherein the determination of the angle to which the steering-control is turned is calculated using an equation $$\Delta\phi = a^* [U(t_2) - U(t_1)]$$

in which $\Delta\phi$ represents a change in angle of the steering-control, a represents a constant proportional to the size of the feel provider electric motor, $U(t_1)$ represents the voltage induced in the feel provider electric motor at time corresponding to the last valid angle for the steering control and $U(t_2)$ represents a current voltage induced in the feel provider electric motor.

7. The power-assisted steering system according to claim 1 wherein the electric motor is a commutator motor or a DC motor.

8. The power-assisted steering system according to claim 7 wherein the electric motor is a commutator motor and a passage through zero of a voltage from a first winding of the commutator motor is monitored and used in calculating a change in angle of the steering control to be calculated.

9. The power-assisted steering system according to claim 8, wherein when the voltage from a first winding passes through zero, a voltage from a second and a third winding is monitored and the induced voltage and a direction of rotation of the steering control is determinable from a difference between the second and third winding voltages and the sign of the second and third winding voltages and the direction of the passage through zero of the first winding voltage.

10. The power-assisted steering system according to claim 7 wherein the motor has at least ten poles.

11. The power-assisted steering system according to claim 1 wherein an additional steering control-unit or an additional electrical circuit performs the calculation of a virtual angle of the steering control.

12. The power-assisted steering system according to claim 11, wherein the additional steering control-unit or the electrical circuit controls the wheel angle positioner.

13. The power-assisted steering system according to claim 1 being a steer-by-wire steering system.

14. The power-assisted steering system according to claim 1, wherein as soon as the angle-sensors for the steering-control are again supplying valid values, the difference between a valid steering-control angle-sensor value and the position of the steering control which had been determined by computation up to that point is allowed for by the steering control-unit in its command signal to the wheel angle positioner.

15. The power-assisted steering system according to claim 1, wherein in full lock for the wheels is simulated by constraining the determination of steering-control angle to lie within specified limits.

16. The power-assisted steering system according to claim 1 wherein the non-trackborne vehicle is a motor vehicle.

17. The power-assisted steering system according to claim 1 wherein the steering control is a steering wheel.

18. The power-assisted steering system according to claim 1, wherein the voltage is picked off from a winding of the feel provider electric motor and used to determine the angle of the steering control and its angular velocity.

* * * * *